C. W. SALADEE.
Whiffletree Snap-Hooks.
No. 138,699.                    Patented May 6, 1873.
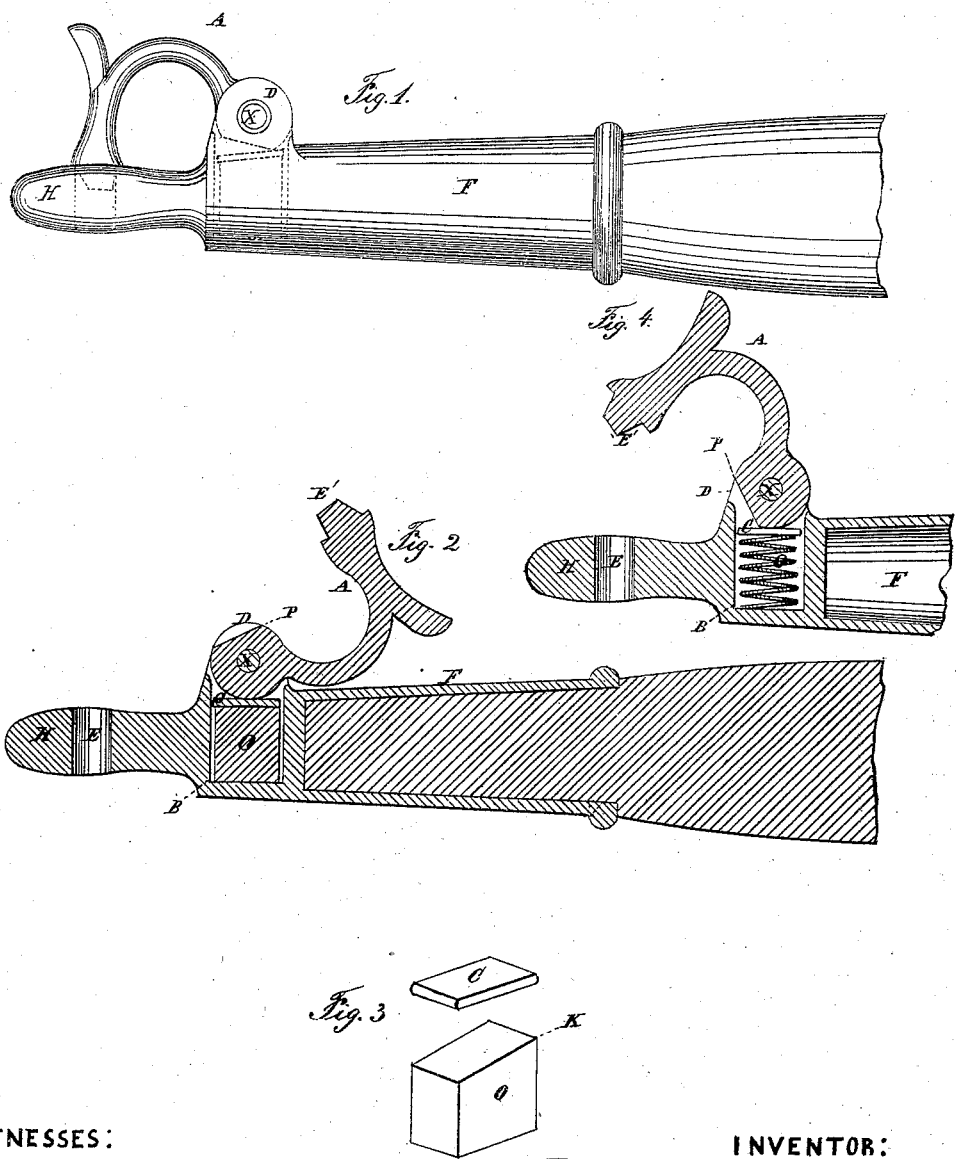
WITNESSES:                    INVENTOR:

UNITED STATES PATENT OFFICE.

CYRUS W. SALADEE, OF PITTSBURG, PENNSYLVANIA.

IMPROVEMENT IN WHIFFLETREE SNAP-HOOKS.

Specification forming part of Letters Patent No. 138,699, dated May 6, 1873; application filed April 29, 1873.

*To all whom it may concern:*

Be it known that I, CYRUS W. SALADEE, of Pittsburg, in the State of Pennsylvania, have invented a certain Improvement in Snap-Hooks for Whiffletrees, of which the following is a specification embodying my invention:

Nature and Object.

My present invention consists in an improvement upon the snap-hook for like purpose for which Letters Patent were granted to me November 21, 1865, and relates to the spring actuating the snap-hook A; and has for its object the production of a spring that shall be more effectual in its operation and much cheaper in its manufacture and appliance.

The Drawing.

In the drawing, Figure 1 is a full top view; and Fig. 2 is a side elevation in section of the complete device in position upon the end of the whiffletree; and Fig. 3 is a detached view of the spring O and friction-plate C resting thereon; and Fig. 4 is a side elevation in section, showing a spiral spring substituted for the rubber spring seen in Fig. 2.

General Description.

F is a ferrule or socket, upon the outer end of which is formed the trace-hook H, and on the top of which is raised the ears D D, between which is secured and operated the snap-hook A by means of the passing pintal or rivet X—the parts F, H, and A being the same as shown and described in my former patent. A recess, B, is formed in the front end of the socket F, into which is placed the rubber block or spring O, the top of which is provided with a friction-plate, c, on which rests and acts the bearing P of the snap-hook A, as is clearly seen in Fig. 2. As the point of the hook A is raised up the rear corner or end of the bearing P presses upon the top of the spring O with increased power, and compressing the spring to the desired extent. When the hook is let go, at the proper point it will spring back to its position, and thus securely hold the trace upon the trace-hook H, when in use; or it may be raised up to release the trace when desired so to do.

It will be understood, of course, that a conical-shaped spiral spring may be substituted for the rubber block, as may be seen in Fig. 4, and produce the same effect; but I consider the rubber the best material for the purpose specified.

In the detached view, Fig. 3, it will be seen that the rubber block O is formed with an incline or angular surface on top in the direction of the dotted line K, which form is designed to give greater elastic force against the rear end of the bearing P of the hook A than would be the case if the top of the block was parallel with its bottom, and thereby secure a softer and better action in the operation of the hook than could be done in any other form. This rubber block need not, necessarily, be cut into the form of an oblong square, as shown in the drawing, as a round cylindrical-shaped block or a ball of rubber will answer the same purpose by making a suitable recess or chamber for its reception in the front end of the ferrule. So, likewise, a spiral cone-shaped spring may be substituted for the rubber and answer the purpose, when combined with the friction-plate C, as is the rubber spring. This last-named modification of spring is shown by Fig. 4 of the drawing.

Claim.

I claim as my invention—

The independent spring O, with or without the friction-plate C, secured to operate within the chamber or recess B of the ferrule or socket F, in combination with the snap-hook A, substantially as and for the purpose set forth.

CYRUS W. SALADEE.

Witnesses:
HERM. LAUTEN,
H. C. ELLIOTT.